US007031022B1

(12) United States Patent
Komori et al.

(10) Patent No.: US 7,031,022 B1
(45) Date of Patent: Apr. 18, 2006

(54) COLOR MANAGEMENT METHOD AND APPARATUS FOR PRINTING PRESS

(75) Inventors: Yoshinori Komori, Ibaragi (JP); Akihiro Inde, Ibaragi (JP)

(73) Assignee: Komori Corporation, Tokyo (JP)

( * ) Notice: Subject to any disclaimer, the term of this patent is extended or adjusted under 35 U.S.C. 154(b) by 861 days.

(21) Appl. No.: 09/655,538

(22) Filed: Sep. 6, 2000

(30) Foreign Application Priority Data

Sep. 6, 1999 (JP) ................................ 11-251497

(51) Int. Cl.
*G06K 15/00* (2006.01)

(52) U.S. Cl. ......................... 358/1.9; 358/1.9; 382/167

(58) Field of Classification Search ................. 358/1.9, 358/1.19, 1.16, 1.15, 1.11, 1.1, 501, 504; 382/167; 395/100, 101
See application file for complete search history.

(56) References Cited

U.S. PATENT DOCUMENTS

| | | | | |
|---|---|---|---|---|
| 4,901,254 A | | 2/1990 | Dolezalek et al. | 364/526 |
| 5,023,812 A | | 6/1991 | Pfeiffer | 364/519 |
| 5,333,069 A | * | 7/1994 | Spence | 358/517 |
| 5,636,330 A | * | 6/1997 | Barak | 358/1.9 |
| 6,075,888 A | * | 6/2000 | Schwartz | 382/167 |

FOREIGN PATENT DOCUMENTS

| | | |
|---|---|---|
| DE | 3533549 | 9/1985 |
| EP | 0394 681 | 3/1990 |
| EP | 0518559 | 6/1992 |
| GB | 2283092 | 4/1995 |
| JP | 7-244732 | 9/1995 |
| JP | 9-252414 | 9/1997 |

OTHER PUBLICATIONS

"Specification of Colour of Materials according to the CIE 1976 (L*a*b*) Space and the CIE 1976 (L*u*b*) Space", JIS Z 8729, Feb. 1980.

"Method of Specification of Colour Differences for Opaque Materials", JIS Z 8730, Feb. 1980.

* cited by examiner

*Primary Examiner*—Gabriel Garcia
*Assistant Examiner*—Thierry L. Pham
(74) *Attorney, Agent, or Firm*—Blakely Sokoloff Taylor & Zafman

(57) ABSTRACT

In a color management method for a printing press, a color chart formed from a plurality of patches is printed by multi-color printing using the printing press and a plurality of ink colors. Each of the patches has a predetermined combination of dot area percent of the ink colors. The printed color chart is automatically scanned using a calorimeter to sequentially obtain color data of all the patches. A first profile representing a color reproduction characteristic of the printing press is generated on the basis of the obtained color data of the patches and the dot area percent of the ink colors set in the patches. A color management apparatus is also disclosed.

7 Claims, 7 Drawing Sheets

COLOR MANAGEMENT METHOD AND APPARATUS FOR PRINTING PRESS

BACKGROUND OF THE INVENTION

The present invention relates to a color management method and apparatus for a printing press, which are suitable for color matching between a color proofing print and printing products printed by a printing press.

Generally, when printing products are ordered, a color proofing print is presented to the customer in advance to confirm the tint of final printing products. More specifically, a color proofing print is output using a color proofing apparatus (flat-bed proofing machine, color printer, DDCP (Direct Digital Color Proofer), or simplified proofing machine) and presented to the customer to confirm whether the tint is appropriate. If the customer agrees to the tint, the ink supply amount of each color in a printing press is adjusted so that actual printing products have the same tint as that of the color proofing print.

However, it is very difficult to print the same tint as that of the color proofing print by adjusting the ink supply amount of each color in the printing press because the color proofing apparatus and printing press have different color reproduction characteristics, resulting in troubles between the customer and the printing company.

Recently, the color reproduction characteristics of the color proofing apparatus and printing press are checked in advance, and color proofing is done by tint according to the tint of printing products printed by the printing press, thereby preventing troubles with the customer. More specifically, a profile representing the color reproduction characteristic of the color proofing apparatus is compared with a profile representing the color reproduction characteristic of the printing press, and the dot area percent of each of a plurality of standard ink colors in outputting a color proofing print, i.e., the ratio (%) (printed area of a color per unit area) of dots of each of four standard ink colors (to be referred to as ink colors hereinafter), including three primary colors of process inks: yellow, magenta (red), and cyan (blue), and India ink (black) is adjusted such that the color proofing print and printing products printed by the printing press have the same tint. This processing of adjusting the tint to obtain the same colors by the apparatus and printing press is called color matching.

The profiles of an existing color proofing apparatus and printing press provided by press makers have large error because a printing company employs various output conditions and printing conditions (e.g., output and printing environments, printing materials, inks, paper, reference densities, and client requirements). For this reason, the profiles of color proofing apparatus and printing press are individually generated using a manual measurement device under the output and printing conditions in the printing company.

Conventionally, however, since color data of printing products is measured by a manual measurement device in generating the profiles of a color proofing apparatus and printing press, measurement takes a time. Especially, the profiles of the color proofing apparatus and printing press change depending on their outputs and printing environment (ambient temperature and humidity) and therefore must be periodically measured. However, since measurement is time-consuming and cannot be done at a short interval, color matching is executed while keeping large error remaining, resulting in poor precision.

Additionally, manual measurement must wait until inks dry to prevent damage to the printing products. As inks dry, the printing products lose gloss and have subdued colors. When color data is sampled from the printing products having subdued colors, a difference is generated between the color data and that immediately after printing, resulting in poor color matching precision.

Furthermore, conventionally, the measurement device used to generate the profile of the color proofing apparatus is different from that used to generate the profile of the printing press. Accurate color matching is impossible because of the difference in characteristics between the measurement devices.

SUMMARY OF THE INVENTION

It is an object of the present invention to provide a color management method and apparatus for a printing press, which allow highly accurate color matching.

It is another object of the present invention to provide a color management method and apparatus for a printing press, which can generate the profile of the printing press in a short time.

In order to achieve the above objects, there is provided a color management method for a printing press, comprising the steps of printing a color chart formed from a plurality of patches by multi-color printing using the printing press and a plurality of ink colors, each of the patches having a predetermined combination of dot area percent of the ink colors, automatically scanning the printed color chart using a colorimeter to sequentially obtain color data of all the patches, and generating a first profile representing a color reproduction characteristic of the printing press on the basis of the obtained color data of the patches and the dot area percent of the ink colors set in the patches.

DESCRIPTION OF THE PREFERRED EMBODIMENT

The present invention will be described below with reference to the accompanying drawings.

Figure 1:
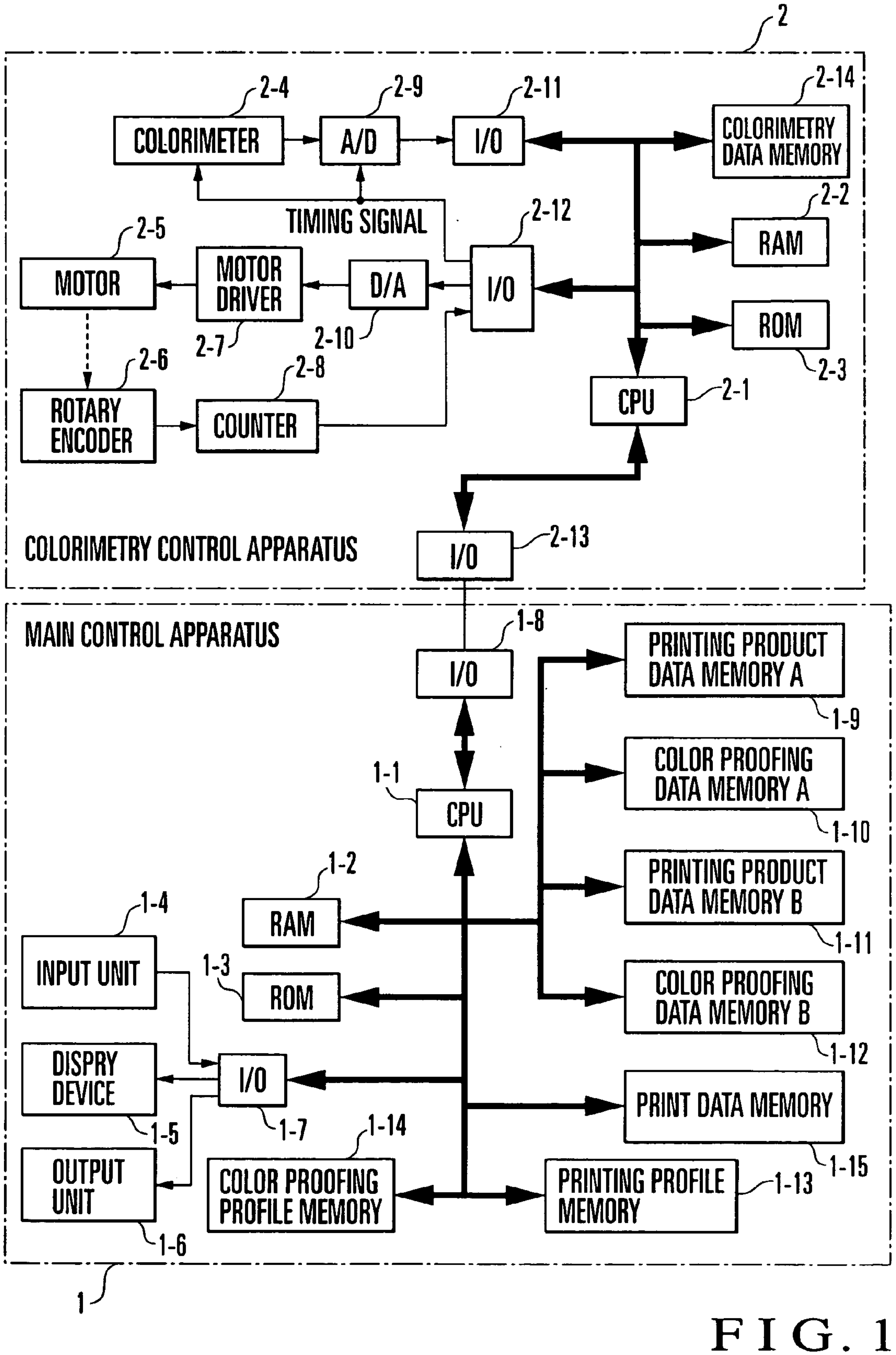
FIG. 1 is a block diagram showing a color management apparatus for a printing press according to an embodiment of the present invention.

FIG. 1 shows a color management apparatus for a printing press according to an embodiment of the present invention. Referring to FIG. 1, the color management apparatus comprises a main control apparatus 1 and a colorimetry control apparatus 2 for controlling a calorimeter (to be described later) under the control of the main control apparatus 1.

The main control apparatus 1 comprises a CPU (Central Processing Unit) 1-1, RAM (Random Access Memory) 1-2, ROM (Read Only Memory) 1-3, input unit 1-4, display device 1-5, output unit 1-6, I/O interfaces 1-7 and 1-8, and memories 1-9 to 1-15 (to be described later). The CPU 1-1 obtains various input information supplied through the I/O interfaces 1-7 and 1-8 and performs various processing operations in accordance with a program stored in the ROM 1-3 while accessing the RAM 1-2 or memories 1-9 to 1-15.

The colorimetry control apparatus 2 comprises a CPU 2-1, RAM 2-2, ROM 2-3, calorimeter 2-4, motor 2-5 for moving the calorimeter, rotary encoder 2-6, motor driver 2-7, counter 2-8, A/D converter 2-9, D/A converter 2-10, I/O interfaces 2-11 to 2-13, and colorimetry data memory 2-14. The CPU 2-1 obtains various input information supplied through the I/O interfaces 2-11 to 2-13 and performs various processing operations in accordance with a program stored in the ROM 2-3 while accessing the RAM 2-2 or memory 2-14. The rotary encoder 2-6 generates a rotary pulse every predetermined rotation count (angle) of the motor 2-5 and outputs the pulse to the counter 2-8.

Figure 10A:
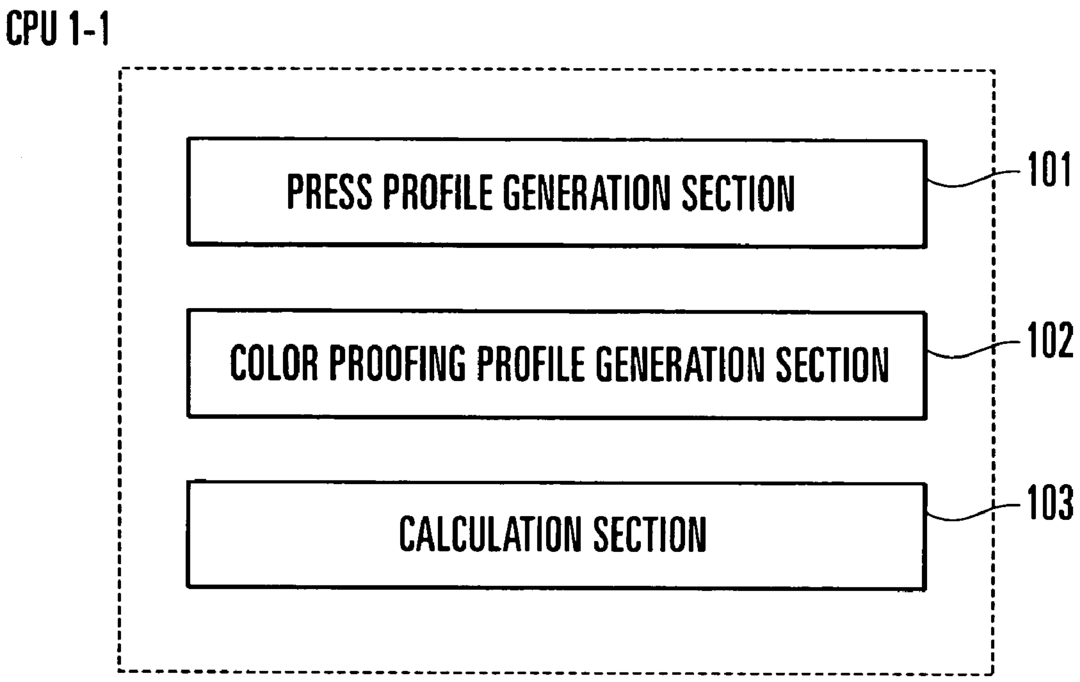
FIG. 10A is a functional block diagram showing the CPU in a main control apparatus shown in FIG. 1.
Figure 10B:
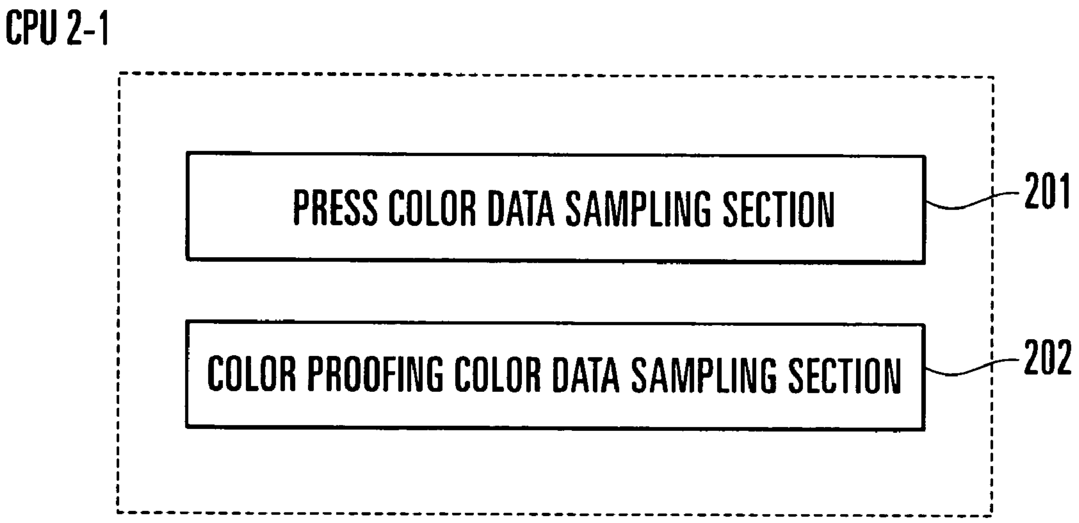
FIG. 10B is a functional block diagram showing the CPU in a colorimetry control apparatus shown in FIG. 1.

The CPU 1-1 has a press profile generation section 101, color proofing profile generation section 102, and calculation section 103 which calculates the dot area percent of an ink color (to be described later) on the basis of the outputs from the press profile generation section 101 and color proofing profile generation section 102, as shown in FIG. 10A. The CPU 2-1 has a press color data sampling section 201 for obtaining or sampling press color data and color proofing print color data sampling section 202 for obtaining or sampling the color proofing print color data, as shown in FIG. 10B.

Figure 2:
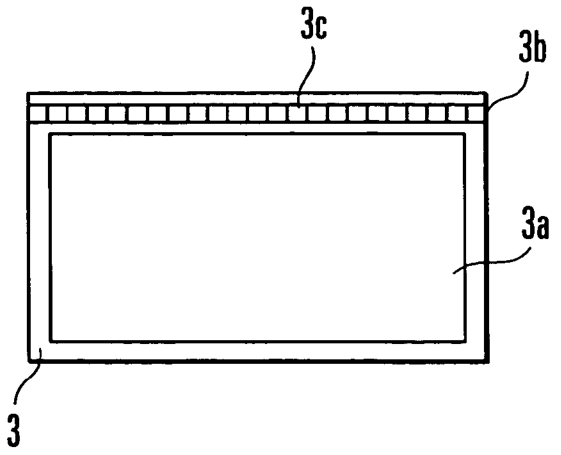
FIG. 2 is a plan view schematically showing a printing product printed by the printing press.

FIG. 2 shows a printing product printed by a printing press (not shown). For a printing product 3, a pattern is printed in a region 3*a* at the center, and a band-shaped color chart (color bar) 3*b* is printed in the margin portion except the pattern region 3*a*. For a general four-color printing product using black, cyan, magenta, and yellow inks, the color chart 3*b* is formed from a number of patches having different values as the dot area percent of the respective colors, e.g., black 5%, cyan 10%, magenta 10%, and yellow 10%, or black 5%, cyan 20%, magenta 10%, and yellow 20%.

Figure 3:
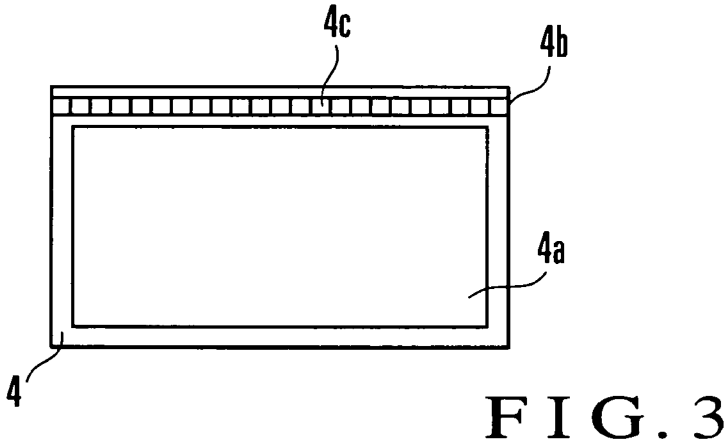
FIG. 3 is a plan view schematically showing a color proofing print output from a color proofing apparatus.

FIG. 3 shows a color proofing print output from a color proofing apparatus (not shown). For a color proofing print 4, a pattern is output to a region 4*a* at the central portion, and a band-shaped color chart (color bar) 4*b* is output to the margin portion except the pattern region 4*a*. The color chart 4*b* is formed from a number of patches 4*c* of one or a plurality of lines. For a general four-color color proofing print using black, cyan, magenta, and yellow inks, the color chart 4*b* is formed from a number of patches having different values as the dot area percent of the respective colors, e.g., black 5%, cyan 10%, magenta 10%, and yellow 10%, or black 5%, cyan 20%, magenta 10%, and yellow 20%.

In the main control apparatus 1, the printing product data memory (A) 1-9 stores the positions of patches of the color chart 3*b* printed on the printing product 3, and the dot area percent of each ink color, which is predetermined in correspondence with each patch 3*c*. Predetermined dot area percent (0% to 100%) of the respective colors, e.g., the first patch 3*c*, 5% for black, 10% for cyan, 10% for magenta, and 10% for yellow are stored in correspondence with the first patch 3*c*, 5% for black, 20% for cyan, 10% for magenta, and 20% for yellow are stored in correspondence with the second patch 3*c* as the dot area percent of the respective colors and, 0% for black, 10% for cyan, 50% for magenta, and 20% for yellow are stored in correspondence with the third patch 3*c* as the dot area percent of the respective colors.

The color proofing data memory (A) 1-10 stores the positions of the patches 4*c* of the color chart 4*b* output to the color proofing print 4, and the dot area percent (%) of each ink color, which is predetermined in correspondence with each patch 4*c*. The data structure of each patch 4*c* is the same as in the above-described case of print data memory 1-9.

The printing product data memory (B) 1-11 stores colorimetric values obtained from the color data of each patch 3*c* of the color chart 3*b* printed on the printing product 3, which is sampled by the calorimeter 2-4. The color proofing data memory (B) 1-12 stores colorimetric values obtained from the color data of each patch 4*c* of the color chart 4*b* output to the color proofing print 4, which is sampled by the calorimeter 2-4. Color data sampling from the patches 3*c* and 4*c* using the colorimeter 2-4 will be described later.

The printing profile memory 1-13 stores a profile (the relationship between the dot area percent and the colorimetric values of each ink color of each printed patch) representing the color reproduction characteristic of the printing press. The color proofing profile memory 1-14 stores a profile (the relationship between the dot area percent and the colorimetric values of each ink color of each printed patch) representing the color reproduction characteristic of the color proofing apparatus. The procedure of generating the profiles to be stored in the memories 1-13 and 1-14 will be described later. The print data memory 1-15 stores the dot area percent of each part of a printing plate for each ink color, which is used to print the printing product 3.

Figure 4:
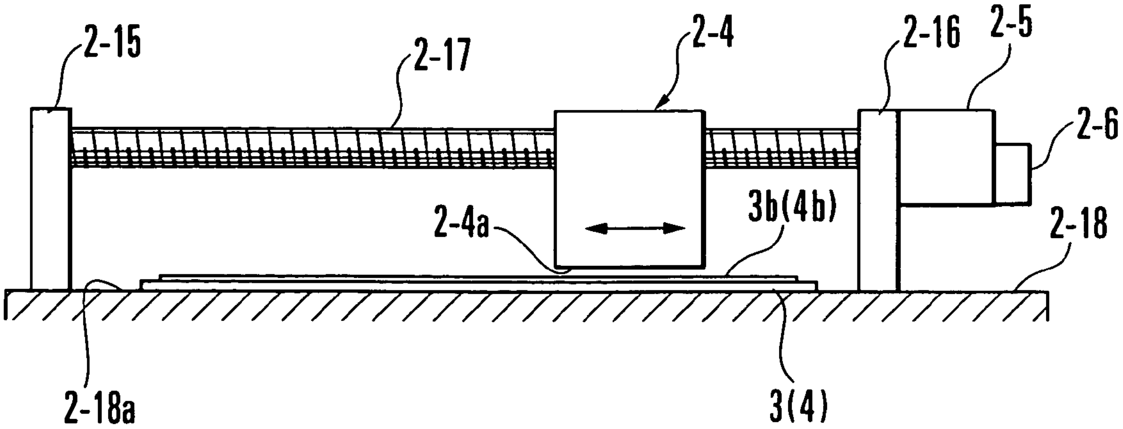
FIG. 4 is a front view showing the installation state of a calorimeter.

In the colorimetry control apparatus 2, the calorimeter 2-4 is attached to a ball screw (feed screw) 2-17 provided between columns 2-15 and 2-16, as shown in FIG. 4. The ball screw 2-17 is rotated in the forward or reverse direction by the motor 2-5. As the ball screw 2-17 rotates in the forward or reverse direction, the calorimeter 2-4 is guided by the ball screw 2-17 and moves between the columns 2-15 and 2-16. A head portion 2-4*a* of the calorimeter 2-4 opposes a surface 2-18*a* of a measuring table 2-18, on which a measurement target is placed.

[Procedure of Color Matching Processing]

First, the printing product 3 (FIG. 2) is printed by the printing press, and the color proofing print 4 (FIG. 3) is output from the color proofing apparatus. The color chart 3*b* formed from a number of patches 3*c* each having predetermined dot area percent of the respective ink colors is printed in the margin portion of the printing product 3. The color chart 4*b* formed from a number of patches 4*c* each having predetermined dot area percent of the respective colors is output to the margin portion of the color proofing print 4.

[Generation of Profile of Printing Press (FIG. 5)]

The operator sets the printing product 3 immediately after printing by the printing press on the measuring table 2-18 (FIG. 4) as a measurement target. In this set state, the color chart 3*b* printed on the printing product 3 opposes the lower surface of the head portion 2-4*a* of the calorimeter 2-4.

The operator inputs, from the input unit 1-4, the position of each patch 3*c* of the color chart 3*b* and the dot area percent of each ink color of each patch 3*c* (step S501). The input dot area percent of each ink color of each patch 3*c* has not a measurement value from a printing plate on which each patch 3*c* is printed, or the actually printed printing product 3 but a value predetermined for each ink color of each patch 3*c*. More specifically, a value actually input to the printing plate printing apparatus in correspondence with each patch 3*c* in generating a printing plate for each ink color of the printing product 3 is used as a set value, and this set value is input in step S501 as the dot area percent of each ink color of each patch 3*c*.

The CPU 1-1 stores, in the printing product data memory (A) 1-9, the input position of each patch 3*c* of the input color chart 3*b*, and the dot area percent of each ink color of each patch 3*c*. The position (measurement position) of each patch 3*c* to be measured by the colorimeter 2-4 is calculated (step S502) and the calculated measurement position is transferred to the colorimetry control apparatus 2 (step S503). The transferred measurement position of each patch 3*c* is stored in the RAM 2-2.

Next, the operator turns on the start switch (not shown) of the input unit 1-4. When the start switch is turned on (YES in step S504), the CPU 1-1 of the main control apparatus 1 sends a measurement start instruction to the CPU 2-1 of the colorimetry control apparatus 2. Upon receiving the measurement start instruction from the main control apparatus 1, the CPU 2-1 of the colorimetry control apparatus 2 rotates the motor 2-5 in the forward direction (step S505).

As the motor 2-5 rotates in the forward direction, the ball screw 2-17 rotates in the forward direction, and the calorimeter 2-4 is guided by the ball screw 2-17 and moves toward the column 2-15 from the home position where the calorimeter 2-4 is in contact with the column 2-16. The CPU 2-1 monitors the momentary moving position of the calorimeter 2-4 through the rotary encoder 2-6 (step S506). When the calorimeter 2-4 reaches the first measurement position stored in the RAM 2-2, the color data of the patch 3*c* corresponding to the measurement position is sampled by the colorimeter 2-4 (step S507). The CPU 2-1 stores the color data (colorimetry data) from the calorimeter 2-4 in the colorimetry data memory 2-14 (step S508).

In a similar way, every time the calorimeter 2-4 reaches a measurement position stored in the RAM 2-2, the CPU 2-1 samples color data of the patch 3*c* located at the measurement position by the colorimeter 2-4 and stores the sampled color data in the colorimetry data memory 2-14. That is, the CPU 2-1 controls automatic scanning of the calorimeter 2-4, thereby sequentially sampling the color data of the patches 3*c* of the color chart 3*b* printed on the printing product 3.

The CPU 2-1 determines whether color data sampling for all patches 3*c* of the color chart 3*b* is ended (step S509). When sampling is ended, the forward rotation of the motor 2-5 is stopped (step S510). Next, the CPU 2-1 rotates the motor 2-5 in the reverse direction (step S511) to return the calorimeter 2-4 to the home position and then stops reverse rotation of the motor 2-5 (steps S512 and S513).

The CPU 2-1 transfers the colorimetry data of each patch 3*c*, which is stored in the memory 2-14, to the main control apparatus 1 (step S514). The transferred colorimetry data of each patch 3*c* is stored in the RAM 1-2. The CPU 1-1 of the main control apparatus 1 calculates colorimetric values from the colorimetry data of each patch 3*c* from the colorimetry control apparatus 2 and stores them in the printing product data memory (B) 1-11 (step S515). The colorimetric values comprise a psychometric lightness L' representing a color space and psychometric chroma coordinates a and b, which are defined by CIE (Commission Internationale de l'Eclairage). The psychometric lightness L' and psychometric chroma coordinates a' and b' are described in detail in "Specification of Colour of Materials according to the CIE 1976 (L'a'b') Space and the CIE 1976 (L'u'v') Space", JIS Z 8729, February 1980 and "Method for Specification of Colour Differences for Opaque Materials", JIS Z 8730, February 1980.

Next, the CPU 1-1 makes the colorimetric values of each patch in the printing product data memory (B) 1-11 correspond to the dot area percent of each ink color of each patch 3*c*, which is stored in the printing product data memory (A) 1-9, in the order of data, and stores these relationships in the printing profile memory 1-13 as the profile of the printing press (step S516).

[Generation of Profile of Color Proofing Apparatus (FIG. 6)]

The operator sets the color proofing print 4 immediately after output from the color proofing apparatus on the measuring table 2-18 (FIG. 4) as a measurement target. In this set state, the color chart 4*b* output to the color proofing print 4 opposes the lower surface of the head portion 2-4*a* of the calorimeter 2-4. In outputting the color proofing print 4, a dot area percent predetermined in correspondence with each ink color of each patch 4*c* is input to the color proofing apparatus. At this time, the input dot area percent of each ink color of each patch 4*c* has the same value as that actually input to the printing plate printing apparatus in correspondence with each patch 3*c* in generating the printing plate for each ink color of the printing product 3.

The operator inputs, from the input unit 1-4, the position of each patch 4*c* of the color chart 4*b* and the dot area percent of each ink color of each patch 4*c* (step S601). The input dot area percent of each ink color of each patch 4*c* has not a measurement value from the color proofing print 4 but a value predetermined for each patch 4*c*. More specifically, a value actually input to the color proofing apparatus in correspondence with each patch 4*c* in outputting the color proofing print 4 is used as a set value, and this set value is input in step S601 as the dot area percent of each ink color of each patch 4*c*. The input set value of the dot area percent of each ink color of each patch 4*c* is the same as the value input to the printing plate printing apparatus in correspondence with each patch 3*c* in generating the printing plate for each ink color of the printing product 3.

The CPU 1-1 stores, in the color proofing data memory 1-10, the input position of each patch 4*c* of the input color chart 4*b*, and the dot area percent of each ink color of each patch 4*c*. The CPU 1-1 calculates the position (measurement position) of each patch 4*c* to be measured by the colorimeter 2-4 (step S602), and transfers the calculated measurement position of each patch 4*c* to the colorimetry control apparatus 2 (step S603). The transferred measurement position of each patch 4*c* is stored in the RAM 2-2.

Next, the operator turns on the start switch (not shown) of the input unit 1-4. When the ON state of the start switch is detected, (step S604), the CPU 1-1 of the main control apparatus 1 sends a measurement start instruction to the CPU 2-1 of the colorimetry control apparatus 2. Upon receiving the measurement start instruction from the main control apparatus 1, the CPU 2-1 of the colorimetry control apparatus 2 rotates the motor 2-5 in the forward direction (step S605).

As the motor 2-5 rotates in the forward direction, the ball screw 2-17 rotates in the forward direction, and the colorimeter 2-4 is guided by the ball screw 2-17 and moves toward the column 2-15 from the home position where the calorimeter 2-4 is in contact with the column 2-16. The CPU 2-1 monitors the momentary moving position of the colorimeter 2-4 through the rotary encoder 2-6 (step S606). When the colorimeter 2-4 reaches the first measurement position stored in the RAM 2-2, the CPU 2-1 samples the color data of the patch 4*c* located at the measurement position by the colorimeter 2-4 (step S607). The CPU 2-1 stores the color data (colorimetry data) output from the calorimeter 2-4 in the colorimetry data memory 2-14 (step S608).

In a similar way, every time the calorimeter 2-4 reaches a measurement position stored in the RAM 2-2, the CPU 2-1 samples the color data of the patch 4*c* located at the measurement position by the colorimeter 2-4 and stores the sampled color data in the colorimetry data memory 2-14. That is, the CPU 2-1 controls automatic scanning of the calorimeter 2-4, thereby sequentially sampling the color data of the patches 4*c* of the color chart 4*b* output to the color proofing print 4.

The CPU 2-1 determines whether color data sampling for all patches 4*c* of the color chart 4*b* is ended (step S609). When sampling is ended, the forward rotation of the motor 2-5 is stopped (step S610). Next, the CPU 2-1 rotates the motor 2-5 in the reverse direction (step S611) to return the calorimeter 2-4 to the home position and then stops reverse rotation of the motor 2-5 (steps S612 and S613).

The CPU 2-1 transfers the colorimetry data of each patch 4*c*, which is stored in the memory 2-14, to the main control apparatus 1 (step S614). The transferred colorimetry data of each patch 4*c* is stored in the RAM 1-2. The CPU 1-1 of the main control apparatus 1 calculates color values (L'a'b') from the colorimetry data of each patch 4*c* from the colorimetry control apparatus 2 and stores them in the color proofing data memory (B) 1-12 (step S615).

Next, the CPU 1-1 makes the colorimetric value correspond with the dot area percent of each color of each patch 4*c*, which is stored in the color proofing data memory (A) 1-10, in the order of data, and stores these relationships in the color proofing profile memory 1-14 as the profile of the color proofing apparatus (step S616).

[Color Matching (FIG. 7)]

After the profile of the printing press and that of the color proofing apparatus are generated in the above-described manner, color matching is executed. In this color matching, the operator inputs, from the input unit 1-4, the dot area percent of each part of a printing plate for each ink color, which is used to generate the printing plate and print the printing product 3 (step S701).

The input dot area percent of each part of the printing plate for each ink color has not a measurement value from the printing plate but a value predetermined for the part of the printing plate. More specifically, the value actually input to the printing plate printing apparatus in generating the printing plate for each ink color is used as a set value, and this set value is input in step S701 as the dot area percent of each part for each ink color. This dot area percent is the same as that input to the color proofing apparatus to generate the color proofing print.

The CPU 1-1 obtains colorimetric values (three values) corresponding to a dot area percent equal or closest to the dot area percent of each part for generating the printing plate for each ink color from the profile of the printing press in the printing profile memory 1-13 (step S702). Next, the CPU 1-1 obtains the dot area percent of each ink color having color values equal or closest to the colorimetric values (three values) obtained in step S702 from the profile of the color proofing apparatus in the color proofing profile memory 1-14 (step S703).

The CPU 1-1 inputs the obtained data of dot area percent of each ink color to the color proofing apparatus (step S704). The color proofing apparatus outputs a color proofing print on the basis of the dot area percent of each ink color supplied from the main control apparatus 1 (step S705).

Figure 5:
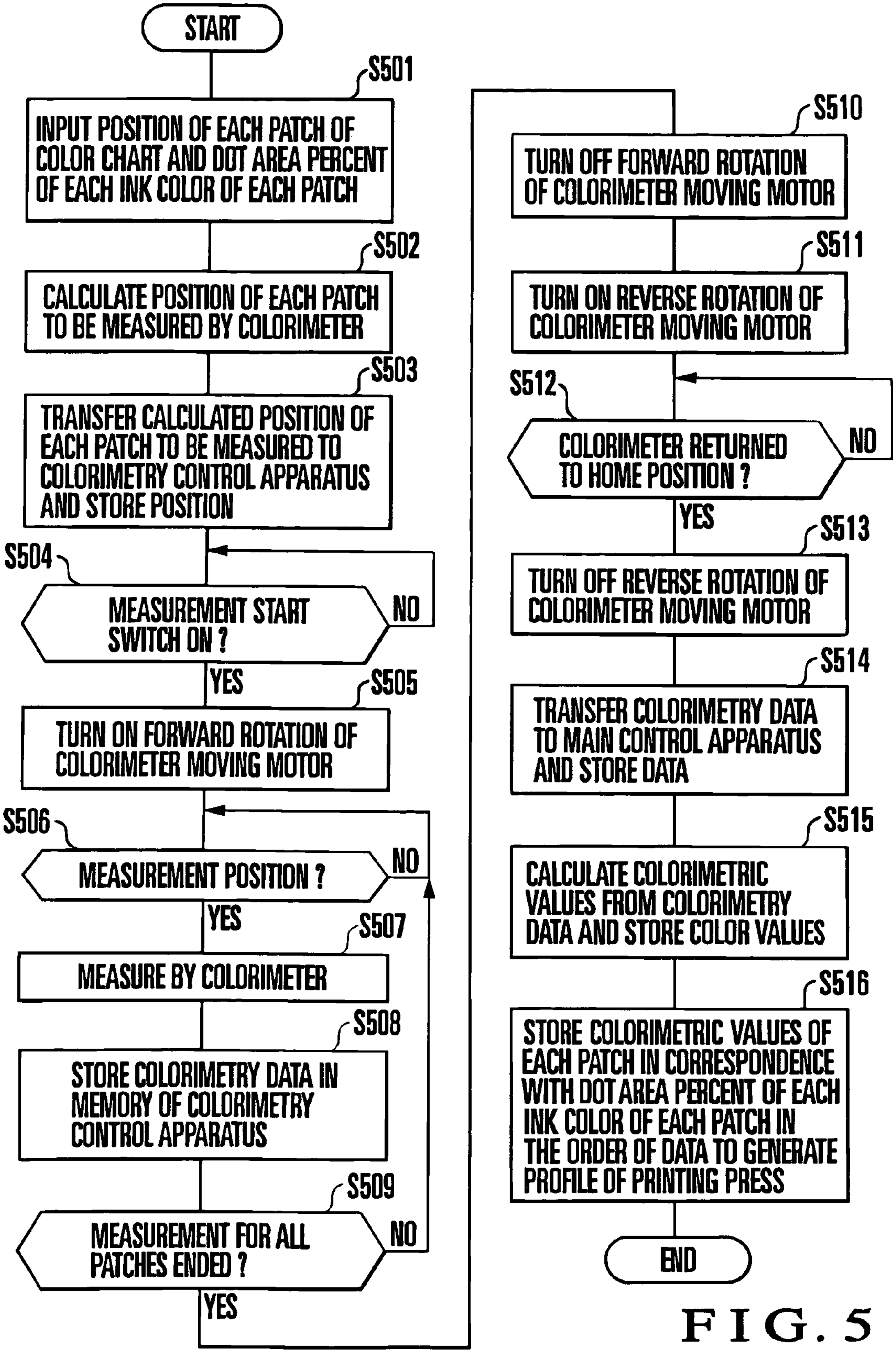
FIG. 5 is a flow chart showing the press profile generation operation of the color management apparatus shown in FIG. 1.
Figure 6:
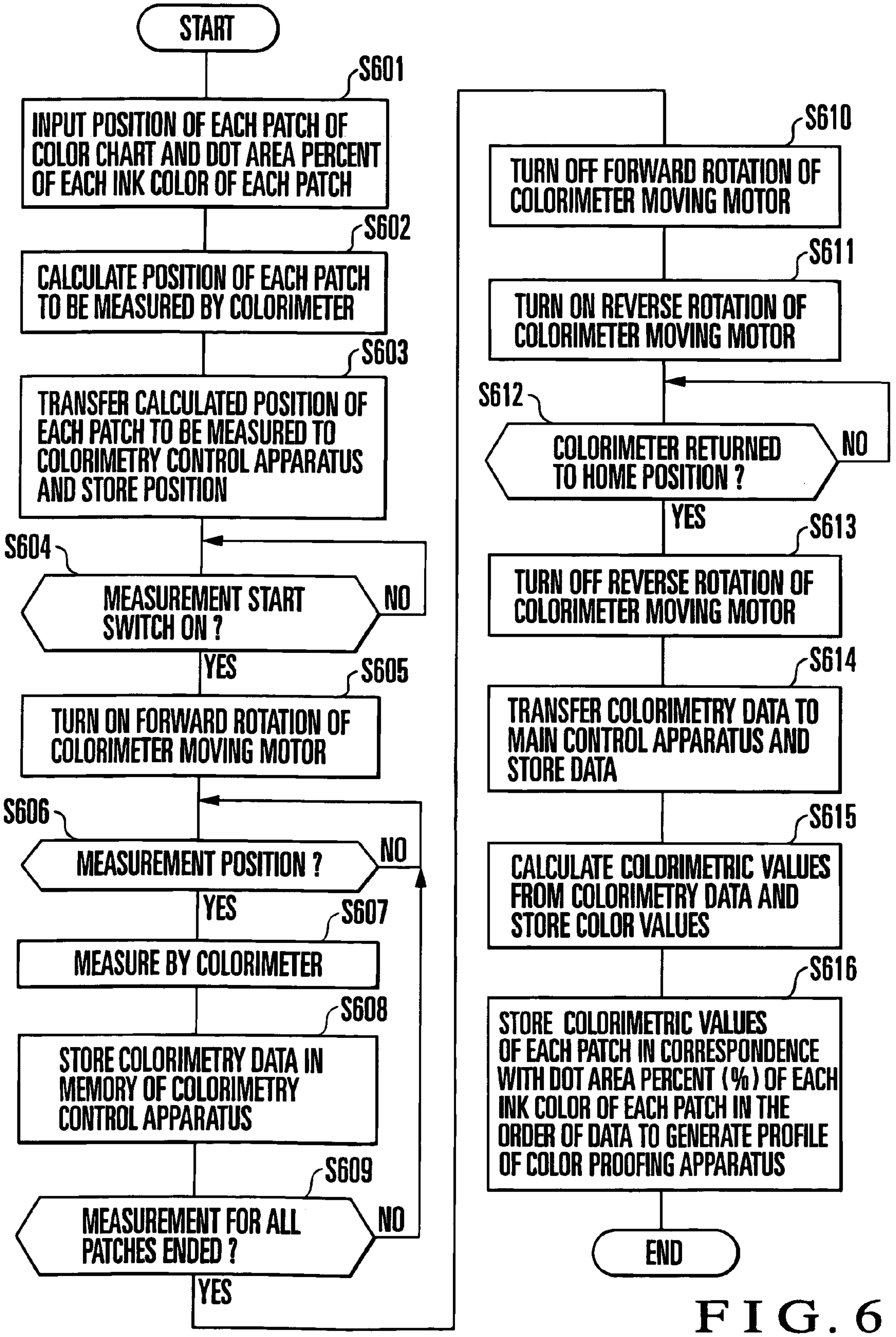
FIG. 6 is a flow chart showing the color proofing apparatus profile generation operation of the color management apparatus shown in FIG. 1.
Figure 7:
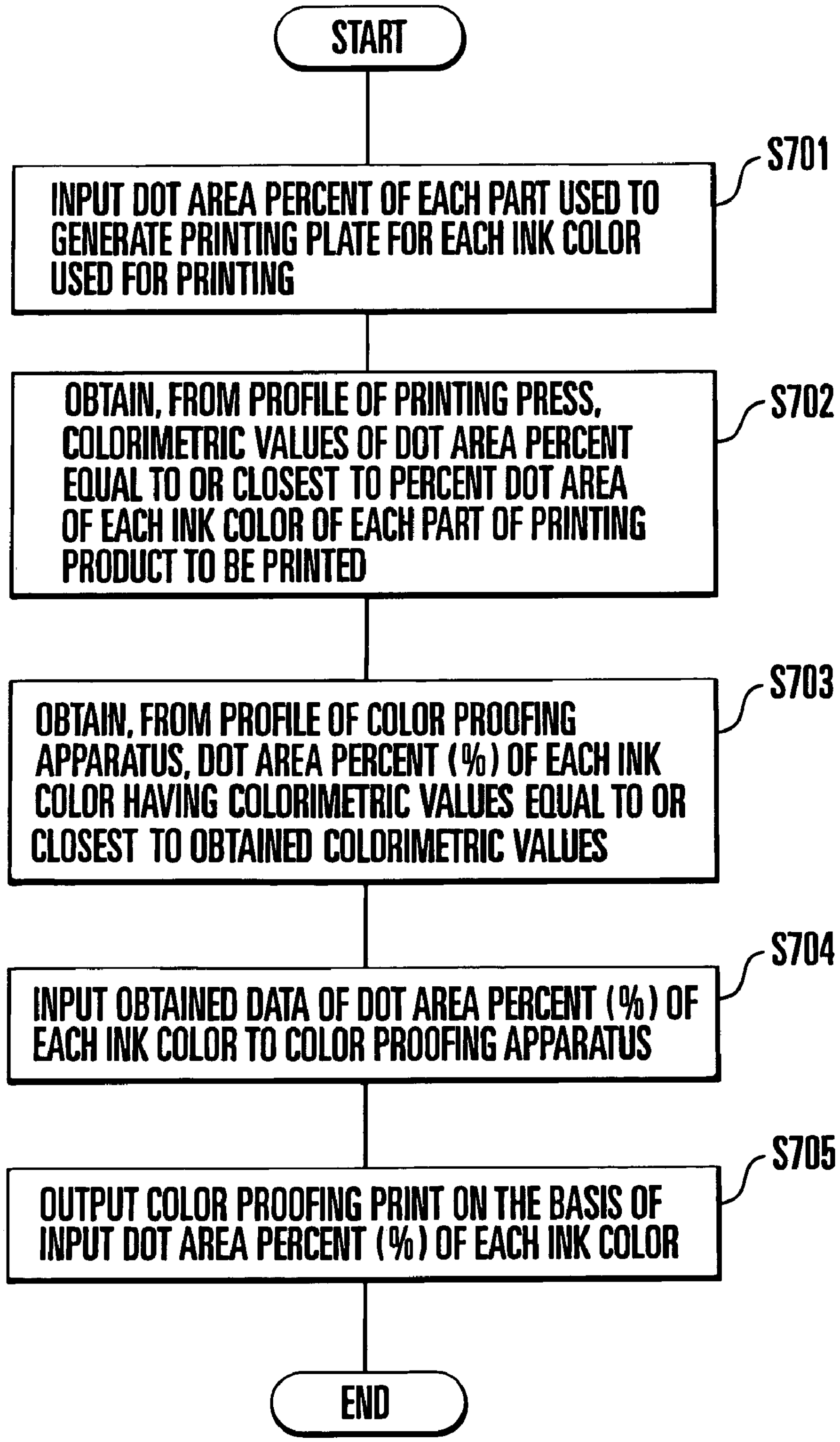
FIG. 7 is a flow chart showing the color matching operation of the color management apparatus shown in FIG. 1.

The relationship between the functional blocks of the CPUs 1-1 and 1-2 and the processing steps shown in FIGS. 5 to 7 will be described next with reference to FIGS. 10A and 10B. The press color data sampling section 201 executes processing in steps S501 to S509 shown in FIG. 5. The color proofing print color data sampling section 202 executes procession in steps S601 to S609 shown in FIG. 6. The press profile generation section 101 executes procession in steps S515 and S516 shown in FIG. 5. The color proofing profile generation section 102 executes processing in steps S615 and S616 shown in FIG. 6. The calculation section 103 executes processing in steps S701 to 703 shown in FIG. 7.

According to this embodiment, since color data sampling in generating the profile of the printing press is done by automatic scanning of the calorimeter 2-4, the measurement time is largely shortened as compared to manual measurement, and the profile of the printing press can be generated in a short time. In addition, color data can be sampled from the printing product 3 immediately after printing, so highly accurate color matching is possible.

According to this embodiment, the profile of the color proofing apparatus can be generated using the colorimeter 2-4 used for generation of press profile. More specifically, since the profile of the printing press and that of the color proofing apparatus can be generated using the same calorimeter 2-4, no characteristic difference is generated between calorimeters, and highly accurate color matching is possible.

According to this embodiment, even when the actually output profile of the color proofing apparatus changes from that provided by the maker because of the difference in color proofing print output conditions (e.g., printing materials, inks, paper, reference densities, and client requirements), an optimum profile of the color proofing apparatus can easily be generated in a short time.

According to this embodiment, since the color charts 3*b* and 4*b* are printed/output on/to the margin portions of the printing product 3 and color proofing print 4, respectively, no special printing/output for generating the profile is necessary, and paper is not wasted. In addition, the productivity is not affected at all.

Figure 8:
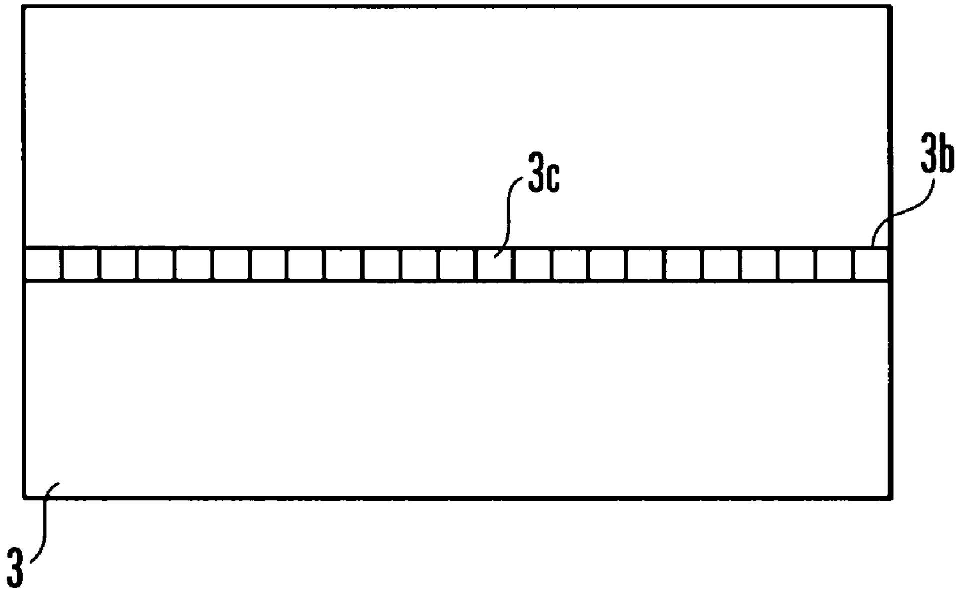
FIG. 8 is a plan view showing another example of a print printed by the printing press.
Figure 9:
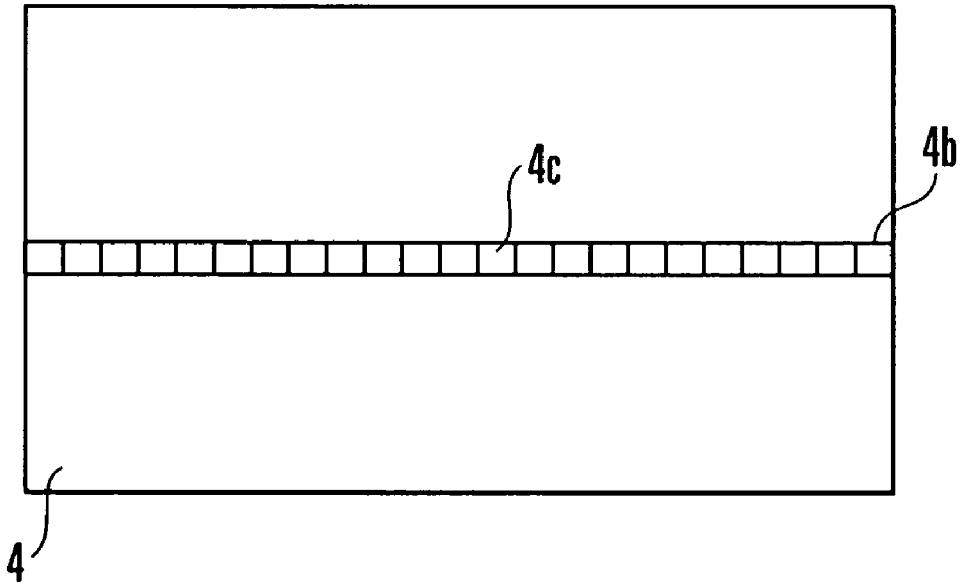
FIG. 9 is a plan view showing another example of a color proofing print output from the color proofing apparatus.

In the above embodiment, the color chart 3*b* is output to the margin portion except the pattern region 3*a* of the printing product 3, or the color chart 4*b* is output to the margin portion except the pattern region 4*a* of the color proofing print 4. However, as shown in FIG. 8 or 9, a printing product 3 or color proofing print 4 having no pattern portion and only the color chart 3*b* or 4*b* printed/output may be used.

In the above embodiment, the profile of the color proofing apparatus is generated using the calorimeter 2-4 used for generation of press profile. Instead of generating the profile of the color proofing apparatus, the profile of an existing color proofing apparatus may be used.

In the above embodiment, the (L'a'b') values are used as colorimetric values. However, the present invention is not limited to this, and (L'u'v') values or (XYZ) values may be used.

Colorimetric values most approximate to the set dot area percent of each ink color are selected with reference to the profile of the printing press. However, the colorimetric values may be corrected in accordance with the degree of approximation, and the color proofing profile may be referred to. When the color proofing profile is to be referred to, the dot area percent of each ink color may be corrected and output for proofing in accordance with the degree of approximation.

As has been described above, according to the present invention, since the color data of each patch of a printed color chart is sampled by automatic scanning of the colorimeter, the measurement time is largely shortened as compared to manual measurement, and the profile of the printing press can be generated in a short time.

In addition, since color data can be sampled from a printing product immediately after printing without damaging the print, highly accurate color matching is possible.

Furthermore, the color data of each patch of a color chart output from the color proofing apparatus can be sampled using the calorimeter as that used for generation of press profile. In this case, since no characteristic difference is generated between calorimeters, and more accurate color matching is possible.

What is claimed is:

1. A color management method for a printing press, comprising:

printing a color chart formed from a plurality of patches by multi-color printing using the printing press and a plurality of ink colors, each of the patches having a predetermined combination of dot area percent of the ink colors;

automatically scanning the printed color chart using a calorimeter to sequentially obtain color data of all the patches;

generating a first profile representing a color reproduction characteristic of the printing press on the basis of the obtained color data of the patches and the dot area percent of the ink colors set in the patches;

outputting, from the color proofing apparatus, a color chart formed from a plurality of patches using a plurality of ink colors, each of the patches having a predetermined combination of dot area percent of the ink colors;

automatically scanning the printed color chart using the colorimeter to sequentially obtain color data of all the patches; and generating a second profile representing a color reproduction characteristic of a color proofing apparatus on the basis of the obtained color data of the patches and the dot area percent of the ink colors set in the patches, and calculating the dot area percent of each ink color used to output the color proofing print on the basis of the first and second profiles, by obtaining, from the first profile, color values of a dot area percent most approximate to the dot area percent of each ink color of a printed portion, and by obtaining, from the second profile, the dot area percent of each ink color having color values most approximate to the obtained color values, wherein said generating includes calculating color values using the sampled color data of the patches, and generating the first and second profiles in which the obtained color values correspond to the dot area percent of each ink color set in the patches.

2. The method according to claim 1, wherein the color values comprise a plurality of values representing a color space.

3. The method according to claim 2, wherein the color values comprise three values including a psychometric lightness L' and psychometric chroma coordinates a' and b'.

4. A color management apparatus for a printing press, comprising:

first color data sampling means for automatically scanning a color chart formed from a plurality of patches printed by multi-color printing using the printing press and a plurality of ink colors so as to sample color data of all the patches, each of the patches having a predetermined combination of dot area percent of the ink colors;

first profile generation means for generating a first profile representing a color reproduction characteristic of the printing press on the basis of the color data of the patches, which are sampled by said first color data sampling means, and the dot area percent of the ink colors set in the patches;

second color data sampling means for automatically scanning a color chart formed from a plurality of patches output from a color proofing apparatus by multi-color printing using a plurality of ink colors so as to sample color data of all the patches, each of the patches having a predetermined combination of dot area percent of the ink colors; and second profile generation means for generating a second profile representing the color reproduction characteristic of the color proofing apparatus on the basis of the color data of the patches, which are output from said second color data sampling means, and the dot area percent of the ink colors set in the patches, and calculation means calculates the dot area percent of each ink color used to output the color proofing print on the basis of the first and second profiles output from said first and second profile generation means; wherein said calculation means obtains color values of a dot area percent most approximate to the dot area percent of each ink color of a printed portion from the first profile generated by said first profile generation means, and then obtains the dot area percent of each ink color having color values most approximate to the obtained color values from the second profile generated by said second profile generation means;

and said first and second profile generation means calculates color values using the color data of the patches, which are output from said first and second color data sampling means, and then generates the first and second profiles by making the obtained color values correspond to the dot area percent of each ink color set in the patches, respectively.

5. The apparatus according to claim 4, wherein the color values comprise a plurality of values representing a color space.

6. The apparatus according to claim 5, wherein the color values comprise three values including a psychometric lightness L' and psychometric chroma coordinates a' and b'.

7. A color management apparatus for a printing press, comprising:

color data sampling means for automatically scanning a color chart formed from a plurality of patches printed by multi-color printing using the printing press and a plurality of ink colors so as to sample color data of all the patches, each of the patches having a predetermined combination of dot area percent of the ink colors and a color chart formed from a plurality of patches output from the color proofing apparatus by multi-color printing using a plurality of ink colors so as to sample color data of all the patches, each of the patches having a predetermined combination of dot area percent of the ink colors;

profile generation means for generating a first profile representing a color reproduction characteristic of the printing press on the basis of the color data of the patches, which are sampled by said color data sampling means, and the dot area percent of the ink colors set in the patches and a second profile representing the color reproduction characteristic of the color proofing apparatus on the basis of the color data of the patches, which are output from said color data sampling means, and the dot area percent of the ink colors set in the patches, and calculation means for calculating the dot area percent of each ink color used to output the color proofing print on the basis of the first and second profiles output from said profile generation means, wherein said calculation means obtains color values of a dot area percent most approximate to the dot area percent of each ink color of a printed portion from the first profile generated by said profile generation means, and then obtains the dot area percent of each ink color having color values most approximate to the obtained color values from the second profile generated by said profile generation means;

and said profile generation means calculate color values using the color data of the patches, which are output from said color data sampling means, and then generates the first and second profiles by making the obtained color values correspond to the dot area percent of each ink color set in the patches.

* * * * *